E. F. PRESBREY.
Bracelets.
No. 156,858.                      Patented Nov. 17, 1874.
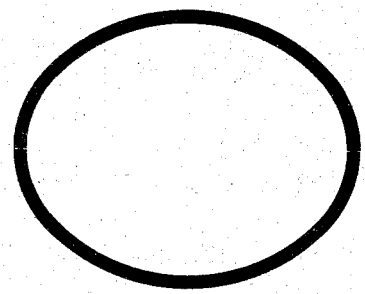
FIG. 1.
FIG. 2.
FIG. 3.
WITNESSES.                      INVENTOR.
Walter B. Vincent
J. T. Rich
Edward F. Presbrey

UNITED STATES PATENT OFFICE.

EDWARD F. PRESBREY, OF PROVIDENCE, RHODE ISLAND.

IMPROVEMENT IN BRACELETS.

Specification forming part of Letters Patent No. 156,858, dated November 17, 1874; application filed May 18, 1874.

*To all whom it may concern:*

Be it known that I, EDWARD F. PRESBREY, of the city and county of Providence, in the State of Rhode Island, have made certain new and useful Improvements in Ornamenting Bracelets and other articles of Jewelry; and I do hereby declare that the following specification, taken in connection with the drawing making a part of the same, is a full, clear, and exact description thereof.

Figure 1 is a side view. Fig. 2 is a top view. Fig. 3 is a view of the end of one section.

The object of my invention is to produce, at a moderate expense, a bracelet which, for beauty and finish, shall be superior to the low-priced bracelets now in the market.

I make the bracelet in the ordinary manner, from brass or other cheap metal, and subsequently enamel or japan it, so as to completely conceal the metal, as shown in the drawing. I then ornament it with some tasteful design, as shown in Fig. 2, which is engraved thereon. The engraving cuts through the enamel or japan, and slightly into the metal, thus making the lines very distinct and brilliant by reason of their contrast with the black ground, the whole forming a most pleasing ornament.

What I claim as my invention, and desire to secure by Letters Patent, is—

A bracelet or other article of jewelry made of metal, provided with a uniform coating of enamel or japan, and having an ornamental design cut or otherwise engraved through the same, so as to expose the bright metal to view, substantially as set forth.

EDWARD F. PRESBREY.

Witnesses:
 WALTER B. VINCENT,
 J. T. RICH.